(12) United States Patent
Demir et al.

(10) Patent No.: US 10,217,097 B2
(45) Date of Patent: Feb. 26, 2019

(54) ELECTRONIC PAYMENT TERMINAL AND COUPLING DEVICE

(71) Applicant: INGENICO GROUP, Paris (FR)

(72) Inventors: Herman Demir, Valence (FR); Cyril Janot, Dijon (FR)

(73) Assignee: INGENICO GROUP, Paris (FR)

(*) Notice: Subject to any disclaimer, the term of this patent is extended or adjusted under 35 U.S.C. 154(b) by 366 days.

(21) Appl. No.: 15/234,156

(22) Filed: Aug. 11, 2016

(65) Prior Publication Data

US 2017/0046678 A1  Feb. 16, 2017

(30) Foreign Application Priority Data

Aug. 11, 2015  (FR) .................................... 15 57675

(51) Int. Cl.
| | |
|---|---|
| G06Q 20/20 | (2012.01) |
| G06K 7/08 | (2006.01) |
| G07G 1/00 | (2006.01) |
| G06Q 20/10 | (2012.01) |

(52) U.S. Cl.
CPC ........... G06Q 20/204 (2013.01); G06K 7/082 (2013.01); G06Q 20/105 (2013.01); G06Q 20/20 (2013.01); G07G 1/0018 (2013.01)

(58) Field of Classification Search
CPC ..................................................... H01Q 1/242

USPC .......................................................... 705/17
See application file for complete search history.

(56) References Cited

U.S. PATENT DOCUMENTS

| | | |
|---|---|---|
| 9,092,766 B1 | 7/2015 | Bedier et al. |
| 2005/0236480 A1 | 10/2005 | Vrotsos et al. |
| 2011/0084131 A1 | 4/2011 | McKelvey |
| 2016/0285151 A1* | 9/2016 | Lee ......................... H01Q 1/242 |

OTHER PUBLICATIONS

French Search Report and Written Opinion dated May 9, 2016 for corresponding French Application No. 1557675, filed Aug. 11, 2015.
English translation of the French Written Opinion dated May 9, 2016 for corresponding French Application No. 1557675, filed Aug. 11, 2015.

* cited by examiner

*Primary Examiner* — Russell S Glass
(74) *Attorney, Agent, or Firm* — David D. Brush; Westman, Champlin & Koehler, P.A.

(57) ABSTRACT

An electronic payment terminal has a magnetic stripe payment card reader including a card passage reinforced in its lower part by a metal rail and a radio module integrated with at least one printed circuit board of the electronic payment terminal. The electronic payment terminal has a coupling device connected to the radio module via a metal part assembled with a plastic part. The coupling device is adapted to forming, with the metal rail, an antenna associated with the radio module.

5 Claims, 3 Drawing Sheets

ELECTRONIC PAYMENT TERMINAL AND COUPLING DEVICE

1. CROSS-REFERENCE TO RELATED APPLICATIONS

This Application claims priority to and the benefit of French Patent Application No. FR 1557675, filed Aug. 11, 2015, the content of which is incorporated herein by reference in its entirety.

2. FIELD OF THE DISCLOSURE

The present disclosure relates to the field of electronic payment terminals and more particularly to terminals proposing a function of payment by magnetic stripe cards, through the passage of the magnetic stripe card in a specific reader as well as radio communications functions (GSM, GPRS, WIFI, etc.).

More specifically, the disclosure relates to the optimizing of the radiated performance of the antenna or antennas integrated into terminals for implementing these radio communications functions.

3. PRIOR-ART SOLUTIONS

Current electronic payment terminals conventionally propose several means to make payment to a merchant:
  contactless payment by the presentation, before a contactless reader, of a payment card also having the contactless payment function;
  payment by insertion of a smartcard into a specific reader and then the entry, by the bearer of the smartcard, of his confidential code via the keypad or the screen of the electronic payment terminal;
  payment by the reading of the magnetic stripe of a card during the passage of the card into a specific reader. This function is commonly called a "swipe" function and is illustrated for example in FIG. 1a, where a payment card 11 can be slid into a passage 101 of the electronic payment terminal 10 in such a way that its magnetic stripe can be read by the electronic payment terminal.

The repeated swiping of cards for payment by the reading of magnetic stripes results in wear and tear for the plastic at the point of passage of the cards into the electronic payment terminal. This is why most present-day electronic payment terminals have a reinforced card passage, for example reinforced by the addition of a metal part taking the form of a rail integrated into the bottom of the card passage. Such a rail 102 is illustrated for example in FIG. 1b and provides a low-cost solution to the wear and tear of the passage 101 of the electronic payment terminal 10 due to the use of the "swipe" function. In addition, this "swipe bottom" rail also enables precise positioning of the magnetic stripe payment card during its passage so as to ensure swift payment without error in the reading of the magnetic stripe.

However, from a radiofrequency point of view and more particular from a point of view of antenna radiated performance, this metal part is a constraint. Now most present-day electronic payment terminals effectively have "radio" functions enabling for example communications via GSM, GPRS, WIFI and/or 3G technologies in order to enable a wireless communications link between a bank server (for example) and the electronic payment terminal.

Figure 2:
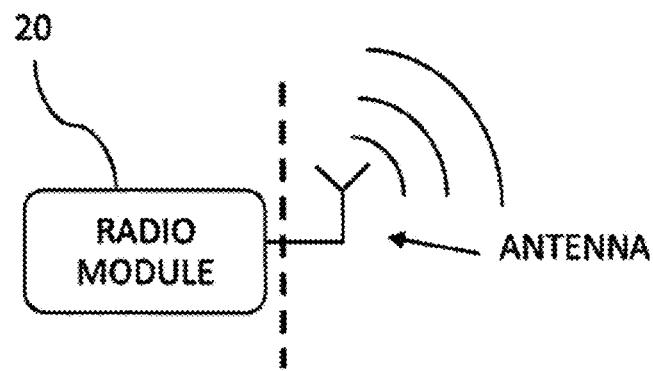

Schematically speaking, the "radio" function in an electronic payment terminal can be subdivided as follows as illustrated in FIG. 2:
  a radio module 20, corresponding to the part relating to the "conducted", integrated into the printed circuit of the electronic payment terminal;
  a radiating element or antenna corresponding to the part relating to the "radiated", which is highly dependent on the environment and especially metal elements that could be in proximity. Indeed, an antenna is a reversible emission/reception device in the field of electromagnetism that optimizes the propagation of a signal coming from the radio module in a medium (air, vacuum, water, etc.). The term used then is "impedance matching", the properties and performance of which are highly dependent on the environment.

Thus, the radiated performance (efficiency, gain, directivity) of a radio function in an electronic payment terminal then depends essentially on the radiating element constituted by the antenna. It is therefore necessary and indispensable to have the most favorable possible environment for implementing this antenna.

Now certain functional constraints disturb the environment of an antenna. These include for example the metal rail for reinforcing the bottom of the magnetic card passage which has great impact on the matching of the antenna, therefore on the radiated performance of the electronic payment terminal.

Current techniques for developing the architecture of an electronic payment terminal are therefore based on obtaining a compromise between functions (radio and "swipe" functions) and performance, necessarily entailing non-optimal solutions.

There is therefore a need for a novel technique for implementing radio communications means of an electronic payment terminal also having a "swipe" function enabling optimal performance at low cost.

4. SUMMARY

An exemplary aspect of the present disclosure relates to an electronic payment terminal having a magnetic stripe payment card reader comprising a card passage reinforced in its lower part by a metal rail and a radio module integrated with at least one printed circuit board of the electronic payment terminal, and comprising a coupling device connected to the radio module via a metal part assembled with a plastic part, the coupling device being adapted to forming, with the metal rail, an antenna associated with the radio module.

Thus, an exemplary aspect of the disclosure proposes a novel and inventive solution to the designing of an electronic payment terminal having both a radio function and a swipe function, in integrating the rail for reinforcing the passage of the magnetic stripe card of the swipe function into the radiated part of the radio function of the electronic payment terminal.

To this end, an exemplary aspect implements a device known as a "coupling" device connected to the radio module integrated with the printed circuit board of the electronic payment terminal (to fulfill the radio function) via a metal part (for the coupling) "carried" by a plastic part that makes it possible to control the positioning of the metal part relative to the metal rail. Thus, the coupling device and the metal rail constitute the antenna associated with the radio module to fulfill the radio function of the electronic payment terminal.

In this way, an exemplary aspect of the present disclosure is used to integrate the metal rail into the design of the antenna used for the radio function of the electronic payment terminal instead of considering this metal rail to be a constraint for the architecture of the radio function of the electronic payment terminal as in the prior art. Indeed, the metal part of the coupling device is directly connected to the radio module of the printed circuit board of the electronic payment terminal so as to set up a link between the "antenna" part (constituted by this metal part and the metal rail) and the "conducted" part of the radio function.

The plastic and metal parts of the coupling device are assembled/fixedly attached together, the plastic part serving as a support for the metal part and making it possible to dispose the metal part at an appropriate distance from the metal rail to obtain the best antenna performance. For example, these two parts of the coupling device are fixed together by "plastic or snap welding", a technique commonly used to create a mechanical link between several parts by the partial deformation of a plastic part and especially to assemble different materials such as metal and plastic.

According to one particular aspect, the metal part of the coupling device has a shape adapted to providing for coupling between the metal rail and the coupling device.

Thus, according to this aspect of the disclosure, the shape of the metal part of the coupling device defines the matching of the coupling between the metal rail and the coupling device itself.

The shape of the metal part of the coupling device therefore depends on the different parameters linked to other elements of the electronic payment terminal such as for example the dimensions of the metal rail itself, the different frequencies of the radio technologies concerned.

The "shape" of this metal part is understood to be not only its geometrical shape but also all its dimensions (width, length, thickness) which can be used to obtain optimal antenna performance in taking account of the metal rail.

For example, the adapted shape of the metal part takes account of at least one parameter belonging to the group comprising:

at least one dimension of the metal rail;
at least one operating characteristic of the radio module.

According to one particular characteristic, the plastic part is assembled with the printed circuit board and has a shape and a position relative to the metal rail that are adapted to maintaining a predetermined distance between the metal part and the metal rail.

Thus, according to this aspect of the disclosure , the shape and the positioning of the plastic part of the coupling device optimize the coupling by precisely controlling the positioning of the metal part relative to the metal rail. Indeed, the coupling is very greatly dependent on the distance between the coupling device (and more particularly its metal part) and the metal rail and it is through the plastic part (fixed to the printed circuit) supporting the metal part that the best distance can be maintained with precision. The plastic part thus contributes to the matching of the coupling between the metal rail and the coupling device.

An aspect of the disclosure also relates to a coupling device comprising at least one metal part assembled with a plastic part adapted to being connected via the metal part to a radio module integrated into at least one printed circuit board of an electronic payment terminal comprising a card passage reinforced in its lower part by a metal rail and also adapted to forming, with the metal rail, an antenna associated with the radio module.

5. LIST OF FIGURES

Figure 1A:
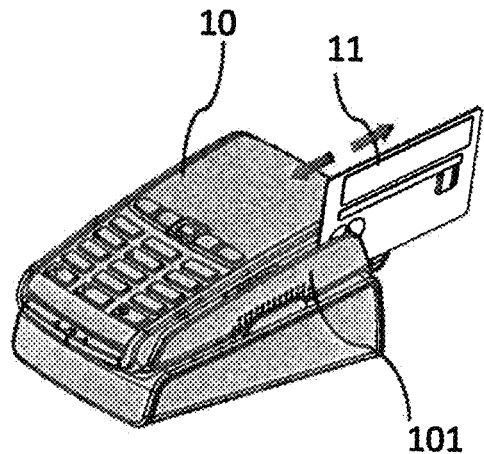
Figure 1B:
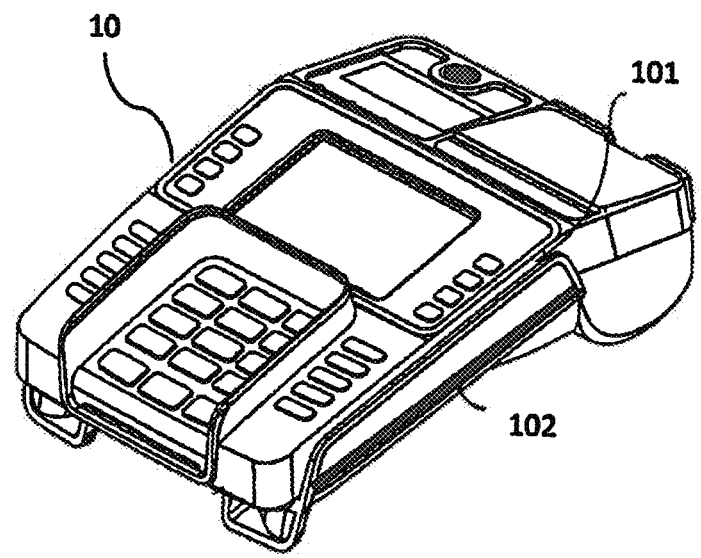
Figure 3:
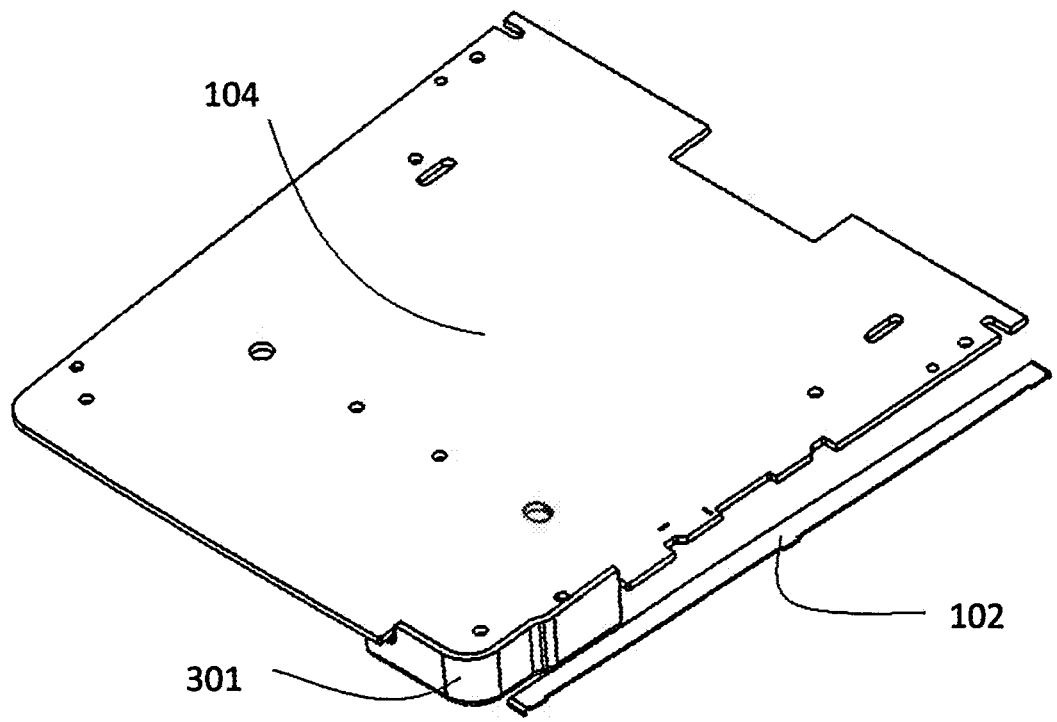
Figure 4A:
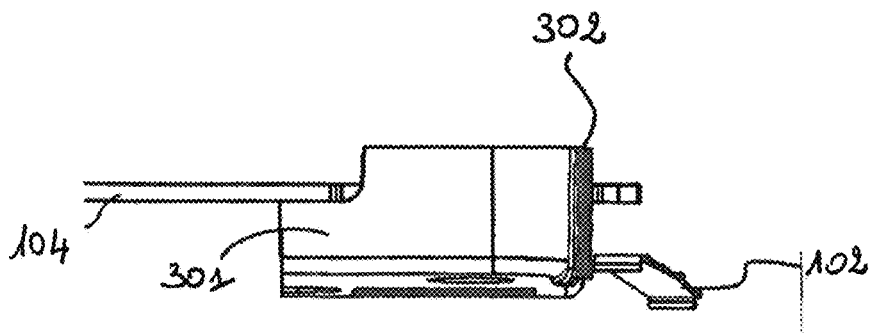
Figure 4B:
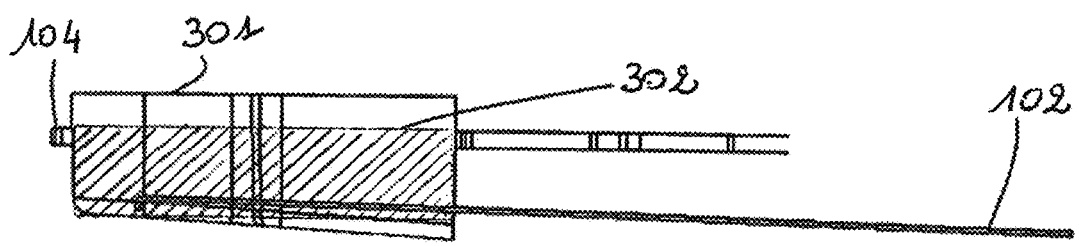
Figure 4C:
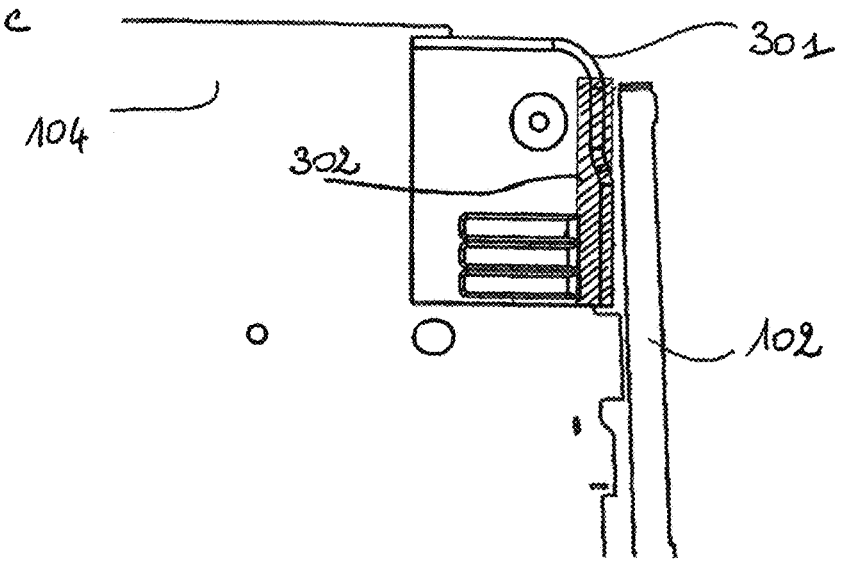

Other features and advantages of the present disclosure shall appear more clearly from the following description of a particular embodiment, given by way of a simple illustratory and non-exhaustive example, and from the appended drawings, of which:

FIGS. 1a and 1b, already commented upon with reference to the prior art, illustrate examples of payment terminals according to the prior art;

FIG. 2, already commented upon with reference to the prior art, presents a diagram of the radio function in an electronic payment terminal;

FIG. 3 presents an example of a part of an electronic payment terminal according to one embodiment of the disclosure;

FIGS. 4a to 4c respectively present a front view, a view in profile and a top view of an example of the coupling device integrated into an electronic payment terminal according to one embodiment of the disclosure.

6. DETAILED DESCRIPTION OF ILLUSTRATIVE EMBODIMENTS 6.1 General Principle

The principle of an exemplary aspect of the present disclosure relates to the integration, into the radiated part of a payment terminal, of the functional constraints related to the presence of a rail for reinforcement of the magnetic card passage, also called a "swipe bottom" rail (also referred to here below as a metal rail). An exemplary embodiment of the solution therefore improves the radiated performance of the electronic payment terminal through this integration of the initial constraint of the metal rail, unlike in the prior-art solutions which sought a compromise between performance and function.

The starting point of the inventors of the present patent application is the observation that the "swipe bottom" rails correspond most often to metal rods of a certain length which correspond to physical lengths characteristic of the radio technologies concerned.

Indeed, the radio technologies concerned (GSM/GPRS/3G) work in the spectral domain close to one gigahertz (from 824 MHz to 2100 MHz), which corresponds to a wavelength of the order of 30 to 12 cm, i.e. half wavelengths of the order of 15 to 6 cm. Now, a "swipe bottom" rail classically has a length of the order of these half wavelengths, i.e. approximately 10 to 15 cm. The "swipe bottom" rail can therefore be considered to be an element radiating at the radiofrequencies concerned.

The inventors have therefore sought a technical solution in which the "swipe bottom" rail is made to enter into resonance with the part relating to the "conducted" of the radio function.

To this end, an exemplary embodiment implements a coupling between a device (called a "coupling") directly connected to the radio module of the electronic payment terminal and the metal rail so as to integrate this metal rail into the design of the emission-reception antenna in order to carry out the radio function or functions of the electronic payment terminal thus improving the radiated performance without compromise between the magnetic stripe read function of a card and the radio antenna performance.

6.2 Description of One Embodiment

Referring now to FIGS. 3 and 4a to 4c, we present an example of a coupling device implemented in an electronic payment terminal.

FIG. 3, according to one particular embodiment of the disclosure, first of all illustrates the plastic part 301 of the coupling device 30 as well as the electronic card (or printed circuit board) 104 of the electronic payment terminal and the metal rail 102.

In this example, the plastic part 301 of the coupling device has a particular shape intended to provide for optimal performances of the antenna formed by the metal part (not illustrated) of the coupling device and the metal rail 102, while being adapted to possibly other internal constraints of the structure of the electronic payment terminal.

Thus, the plastic part 301 forming a support for the metal part of the coupling device for its part makes it possible to maintain with precision the required distance between the metal part of the coupling device and the metal rail in order to obtain the most efficient coupling for the antenna.

It must be noted that this distance, as well as the shape of the metal part of the coupling device, are predetermined for example according to the frequencies of the radio technologies given for the radio function of the electronic payment terminal and according to certain characteristics of the metal rail of the electronic payment terminal.

A more detailed description is now given of the interactions between the different parts of the coupling device and the elements of the electronic payment terminal with reference to FIGS. 4a to 4c.

These figures illustrate a particular embodiment of the disclosure, respectively seen in a front view, a profile view and top view. The shapes (and dimensions) of the metal part 301 and metal part 302 of the coupling device 30 have been chosen purely to illustrate an example of positioning of the coupling device in the electronic payment terminal, especially in relation to the metal rail 102 and the printed circuit board 104. Those skilled in the art will easily refer to their own knowledge to determine the shapes best suited for both these parts of the coupling device as a function especially of the radiated performance desired for the radio function and the dimensions of the metal rail.

Thus, in FIG. 4a (which is a front view), the metal part 302 of the coupling device 30 is represented in the form of a black-colored rectangle. This part 302 has a thickness chosen to enable optimal coupling with the metal rail, it being known that the plastic part 301, through its shape and its positioning on the printed circuit board 104 of the electronic payment terminal, enables an optimal position of the metal part relative to the metal rail 102.

For example, the metal part 302 corresponds to a fairly thin folded sheet metal element. Indeed, the thickness of the metal sheet for the metal part is not vital at the desired frequencies of use (because of the skin effect known to those skilled in the art). For example, at 800 MHz (low frequency), the skin effect gives a minimum critical thickness of about 2.5 µm. Hence a folded sheet metal part with a thickness of 200 µm can be suitable for example.

In FIG. 4b (side view), the metal part 302 is represented as hatched, as in FIG. 4c (top view) where the distance between the metal part 302 and the metal rail 102 can be seen.

These figures therefore illustrate one of the main functions of the metal part 301 of the coupling device 30 which consists in forming a support for the metal part 302 so as to ensure its precise positioning relative to the metal rail 102. Indeed, as already indicated here above, the coupling between the different metal elements (metal part 302 and metal rail 102) of the antenna greatly depends on the distance between these two elements.

Besides, different techniques of fixed attachment/assembly, such as for example "plastic/snap welding", can be implemented to fulfill the function in which the metal part 302 is supported by the plastic part 301. Any other technique enabling the assembly of the plastic parts and metal parts of the coupling device can be used.

Similarly, the plastic part 301 is assembled with the printed circuit board 104 of the electronic payment terminal by being clipped on for example. Here again, any other technique of assembly enabling the plastic part 301 to be fixedly attached to the printed circuit board 104 can be implemented.

Finally, the metal part 302 is connected to the radio module 20 integrated with the printed circuit board 104 in a known way not described in detail in the present application, to enable the working of the antenna thus obtained by coupling this metal part and the metal rail (present in the electronic payment terminal to reinforce the passage of the magnetic card).

The integration of the coupling device 30 formed by a metal part 302 connected to the radio module 20 of the electronic payment terminal and a plastic part 301 forming a support for the metal part and being itself assembled with the printed circuit board of the electronic payment terminal therefore makes it possible, according to one or more exemplary embodiments of the disclosure, to optimize the radiated performance of the radio function of the electronic payment terminal without impairing the other functions of this payment terminal.

6.3 Other Features and Advantages

Another problem is also resolved by the present solution in an exemplary embodiment. This problem relates to the impact of electrostatic discharges on the electronic payment terminal, liable especially to damage the radio module.

Indeed, radio modules are generally not designed to withstand discharges of more than 2 kV or even 6 kV, which is generally insufficient given the classic operation of an electronic payment terminal. To overcome this drawback, since the antennas are conductive, they are generally made inaccessible or are protected against any electrostatic attack (via the use of a radome for example), according to different techniques of the prior art.

Now, the solution according to one or more exemplary embodiments of the disclosure whereby the metal rail is integrated into the implementation of the radio function of the electronic payment terminal and more particularly into the antenna makes it possible, via the coupling between the coupling device and the metal rail, to isolate the radio module of the electronic payment terminal and therefore protect it against electrostatic attacks despite the accessibility of this metal rail and its exposure to electrostatic discharges.

The approach according to one or more exemplary embodiments therefore improves radiated performance without compromise between the function of reading the magnetic stripe of a card, the performance of the radio antenna and immunity against electrostatic attacks.

An exemplary embodiment of the present disclosure proposes a novel approach that does not have all the drawbacks of the prior art, Although the present disclosure has been described with reference to one or more examples, workers skilled in the art will recognize that changes may be made in form and detail without departing from the scope of the disclosure and/or the appended claims.

The invention claimed is:

1. An electronic payment terminal comprising:
   at least one printed circuit board; and
   a magnetic stripe payment card reader comprising:
      a card passage reinforced in its lower part by a metal rail;
      a radio module integrated with the at least one printed circuit board of said electronic payment terminal; and
      a coupling device connected to said radio module via a metal part assembled with a plastic part, said coupling device forming, with said metal rail an antenna associated with said radio module.

2. The electronic payment terminal according to claim 1, wherein said metal part of said coupling device has a shape adapted to providing for coupling between said metal rail and said coupling device.

3. The electronic payment terminal according to claim 2, wherein said adapted shape of said metal part takes account of at least one parameter belonging to the group comprising:
   at least one dimension of said metal rail;
   at least one operating characteristic of said radio module.

4. The electronic payment terminal according to claim 1, wherein said plastic part is assembled with said printed circuit board and has a shape and a position relative to said metal rail that maintain a predetermined distance between said metal part and said metal rail.

5. A coupling device comprising:
   at least one metal part assembled with a plastic part and connected via said metal part to a radio module integrated into at least one printed circuit board of an electronic payment terminal comprising a card passage reinforced in its lower part by a metal rail, said coupling device forming, with said metal rail, an antenna associated with said radio module.

* * * * *